United States Patent Office 3,794,568
Patented Feb. 26, 1974

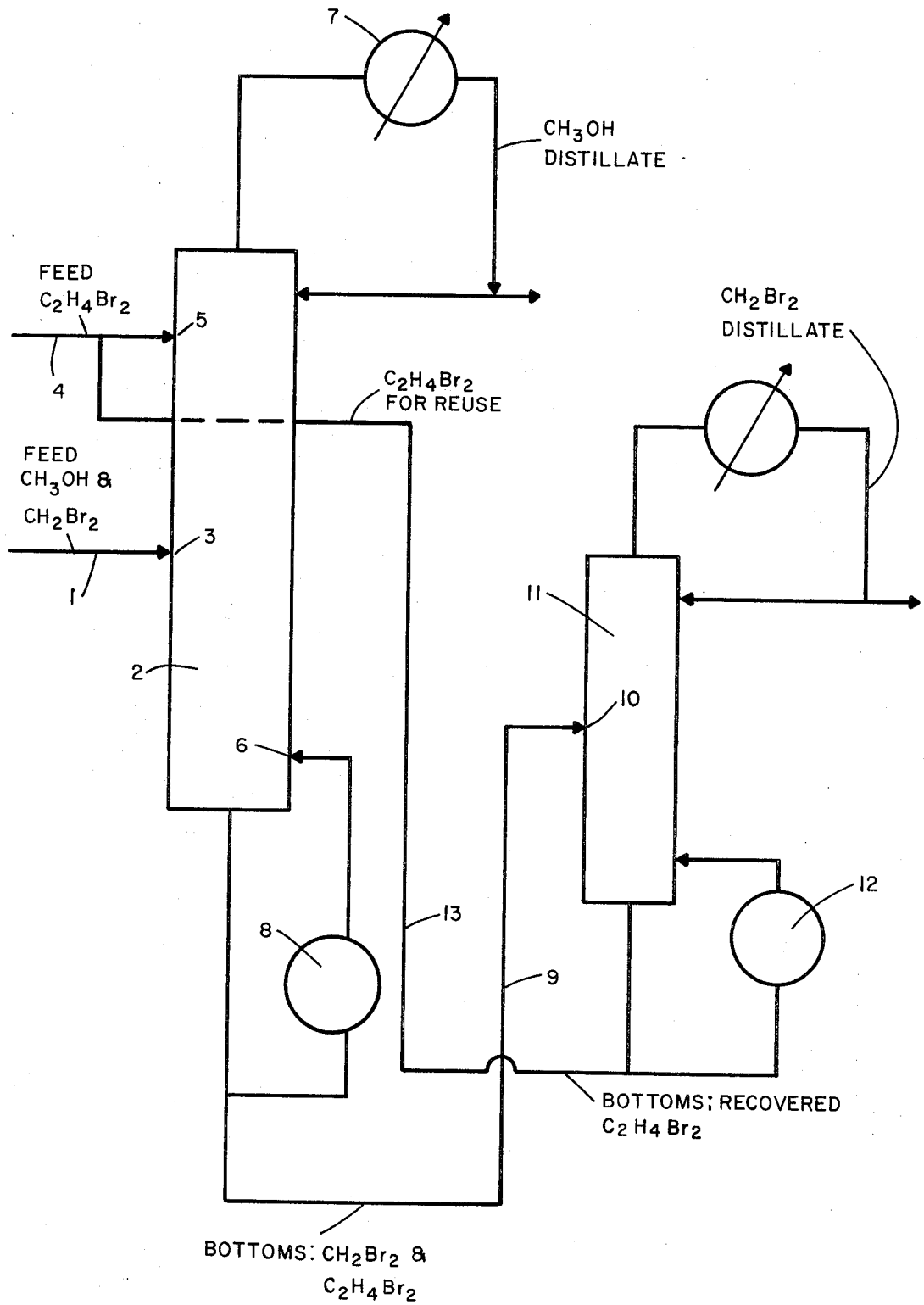

---

3,794,568
SEPARATION OF METHANOL AND METHYLENE BROMIDE BY EXTRACTIVE DISTILLATION WITH ETHYLENE BROMIDE
George A. Daniels and James A. Wingate, Baton Rouge, La., assignors to Ethyl Corporation, Richmond, Va.
Filed Aug. 28, 1972, Ser. No. 284,262
Int. Cl. B01d 3/40
U.S. Cl. 203—67          2 Claims

ABSTRACT OF THE DISCLOSURE

Methylene bromide and methanol form an azeotrope upon distillation. However, they can be separated by extractive distillation in the presence of ethylene dibromide.

SUMMARY OF THE INVENTION

This invention pertains to an extractive distillation procedure for separating methylene bromide and methanol from a mixture thereof, said process comprising refluxing said mixture and contacting the resultant vapors in a column with liquid ethylene dibromide, whereby methylene bromide becomes dissolved in said ethylene dibromide, and collecting substantially pure methanol vapors from the top of said column.

The ethylene dibromide bottoms from a second column can be used as the extractive solvent in the first column.

Methylene bromide-methanol mixtures can result, for example, in producing polybrominated biphenyls by reacting bromine and biphenyl in methylene bromide with a Friedel Craft's catalyst and isolating the product by precipitating from the reaction mixture with methanol. Recovery of the methanol and methylene bromide for reuse offers economic advantages.

DESCRIPTION OF THE FIGURE

The figure is a scehmatic representation of an apparatus for extractive distillation of methanol and methylene bromide according to this invention. A second column is used to separate ethylene dibromide and methylene bromide. The ethylene dibromide is recycled to the first column.

DESCRIPTION OF THE INVENTION

Methanol and methylene bromide form an azeotrope when distilled under normal conditions. Analysis by VPC indicates the distribution in the azeotrope to be 53:47 parts by weight methanol:methylene bromide. In view of this, separation of $CH_2Br_2$-$CH_3OH$ mixtures is hampered. Use of ethylene dibromide as an extractive agent is demonstrated by the following example.

EXAMPLE

A mixture of methylene bromide (100 ml.) and methanol (200 ml.) was brought to total reflux and equilibrium. An initial 5 ml. sample was taken at 4/1 reflux ratio (0.9 ml./minute). Analysis by VPC showed the azeotropic distribution of 53:47 MeOH:MeBr₂. The system was then brought back to total reflux and ethylene dibromide was metered in to the top of the column at 0.67 ml./minute via a syringe pump-Teflon needle valve arrangement. After five minutes, distillation was resumed at 4/1 reflux ratio. Sample bottles were changed after 5–10 ml. had collected.

Analysis of the first four samples gave the following results:

| No. sample: | Percent MeOH (uncorr.) |
|---|---|
| 1 | 95.5 |
| 2 | 98.6 |
| 3 | ca. 99 |
| 4 | ca. 99+ |

Turning to the figure, it schematically depicts how the $CH_3OH$-$CH_2Br_2$ mixture can be separated according to this invention. As shown, a feed of the $CH_3OH$-$CH_2Br_2$ mixture is fed through line 1, into column 2. The

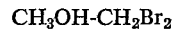

$CH_3OH$-$CH_2Br_2$ mixture is in the vapor or liquid state when fed into column 2 through feed port 3. Jreferably, it is in the vapor state.

As the mixture to be separated enters the column, liquid ethylene dibromide is led into column 2 via line 4. As shown, the $C_2H_4Br_2$ enters the column at a port 5 between the $CH_3OH$-$CH_2Br_2$ feed port and the top of the column.

Ethylene dibromide, being less volatile than $CH_3OH$ or $CH_2Br_2$, flows down the column and out the bottom. Methylene bromide is absorbed by the liquid stream. The column section between feed port 4 and the reboiler port 6 strips methanol from the other two components. Methylene bromide is absorbed from the vapor to the liquid state in the column section between 3 and 5 such that the vapor passing 5 is substantially all methanol and ethylene dibromide. The column section above 5 is refluxed with methanol (utilizing condenser 7) and separates methanol from the ethylene dibromide. The column bottoms from the first column are fed through line 9 and port 10 into second column 11 which provides $CH_2Br_2$ distillate and $C_2H_4Br_2$ column bottoms. Such column bottoms can be fed through line 13, into line 4 for re-use. Reboiler 12 is used with the second column.

For the distillation processes of this invention, enough ethylene dibromide is used to effect separation of methanol from methylene bromide to the desired degree. There is no real upper limit on the amount of ethylene dibromide, this being governed by such secondary considerations as size of vessels and columns, economics, etc.

Good results are obtained using from about 1 to about 50 volumes of ethylene dibromide per volume of methylene bromide; more or less ethylene dibromide can be used.

The results of this invention suggest that other bromine containing materials such as carbon tetrabromide and acetylene tetrabromide are useful as extractive solvents in extractively distilling mixtures of methylene bromide and methanol. Likewise, the results suggest $CBr_4$, $C_2H_4Br_2$, and $Br_2HC$-$CHBr_2$ can be used in extractive distillation of other $CH_2Br_2$-lower alkanol mixtures where the lower alkanols are exemplified by ethanol, the propanols, and the like. Distillation of such mixtures by the techniques of this invention would be of most utility in cases where such mixtures would form azeotropes.

We claim:

1. An extractive distillation procedure for separating methylene bromide and methanol from a mixture thereof, said process comprising refluxing said mixture and contacting the resultant vapors in a column with liquid ethylene dibromide, whereby methylene bromide becomes dissolved in said ethylene dibromide, and collecting substantially pure methanol vapors from the top of said column.

2. A process of claim 1 being further characterized by separating substantially pure methylene bromide from ethylene dibromide in a second column.

References Cited
UNITED STATES PATENTS 3,660,248   5/1972   Tsao _____ 203—7
3,419,477   11/1968  Mattia _____ 203—67

NORMAN YUDKOFF, Primary Examiner
F. SEVER, Assistant Examiner

U.S. Cl. X.R.
260—643 A, D, 664, 671